United States Patent
Plucinski et al.

(10) Patent No.: US 11,635,308 B2
(45) Date of Patent: Apr. 25, 2023

(54) LINEAR VARIABLE DIFFERENTIAL TRANSDUCER CORE STRUCTURE

(71) Applicant: Hamilton Sundstrand Corporation, Charlotte, NC (US)

(72) Inventors: Wojciech Plucinski, Wrzesnia (PL); Michal Zgorecki, Grodkow (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 90 days.

(21) Appl. No.: 17/164,935

(22) Filed: Feb. 2, 2021

(65) Prior Publication Data
US 2021/0278249 A1    Sep. 9, 2021

(30) Foreign Application Priority Data
Mar. 6, 2020 (EP) .................... 20461519

(51) Int. Cl.
*G01D 5/22* (2006.01)
*G01B 7/24* (2006.01)
*G01N 25/16* (2006.01)
*H01F 27/28* (2006.01)

(52) U.S. Cl.
CPC ........... *G01D 5/2291* (2013.01); *G01B 7/24* (2013.01); *G01N 25/16* (2013.01); *H01F 27/28* (2013.01)

(58) Field of Classification Search
CPC ...... G01D 5/22; G01D 5/2291; H01F 21/065; H01F 27/28; G01N 25/16; G01B 7/24
See application file for complete search history.

(56) References Cited

U.S. PATENT DOCUMENTS

| | | | |
|---|---|---|---|
| 3,919,879 A | 11/1975 | Betz | |
| 4,041,758 A | 8/1977 | Stenberg | |
| 4,305,299 A * | 12/1981 | Serata | G01B 7/24 |
| 5,309,995 A * | 5/1994 | Gonzalez | C09K 8/50 166/284 |
| 6,605,940 B1 | 8/2003 | Tabrizi et al. | |
| 9,797,490 B2 | 10/2017 | Marvin et al. | |
| 9,952,064 B2 | 4/2018 | Deshmukh et al. | |
| 10,446,310 B2 | 10/2019 | Sanchihar et al. | |
| 2018/0143038 A1* | 5/2018 | Daniels | G01D 5/2291 |
| 2019/0145797 A1 | 5/2019 | Daniels | |

FOREIGN PATENT DOCUMENTS

JP    H0926302 A    1/1997

OTHER PUBLICATIONS

Extended European Search Report for International Application No. 20461519.9 dated Sep. 15, 2020, 15 pages.

* cited by examiner

*Primary Examiner* — Jermele M Hollington
*Assistant Examiner* — Suresh K Rajaputra
(74) *Attorney, Agent, or Firm* — Cantor Colburn LLP

(57) ABSTRACT

A magnetic core structure for a Linear Variable Differential Transducer (LVDT) comprising an elongate core of magnetic material mounted within a protective tube and means for positioning the core within the protective tube, the means for positioning comprising a ball provided within the protective tube at one end of the core, the ball being formed of an elastic material having a coefficient of thermal expansion selected to compensate the difference in elongation between magnetic core structure components caused by thermal expansion.

8 Claims, 2 Drawing Sheets

FIG. 2A
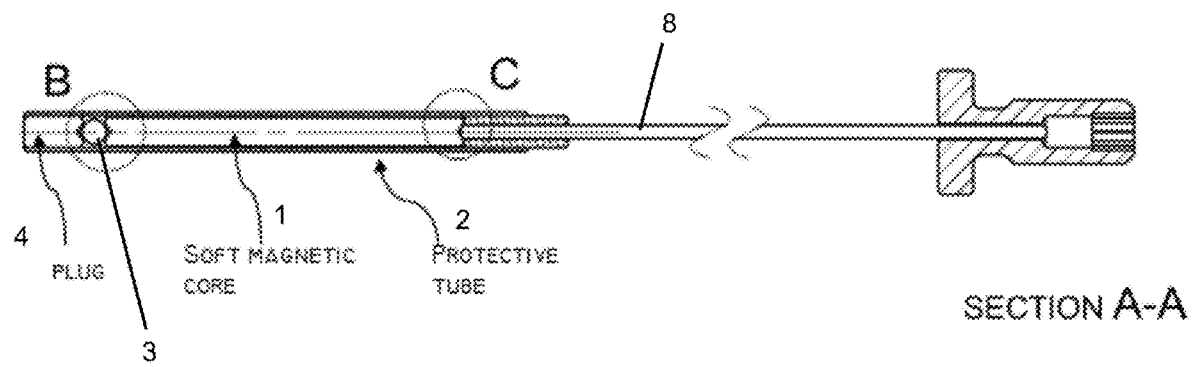
SECTION A-A
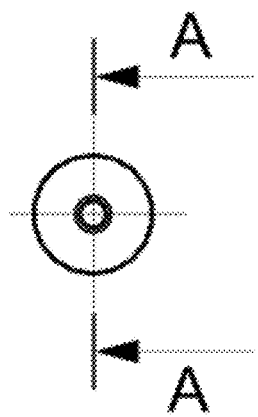
FIG. 2B
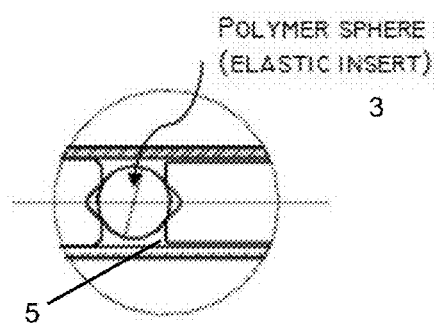
DETAIL B
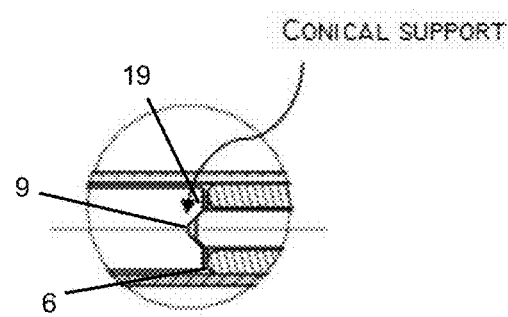
DETAIL C
FIG. 2C  FIG. 2D

LINEAR VARIABLE DIFFERENTIAL TRANSDUCER CORE STRUCTURE

FOREIGN PRIORITY

This application claims priority to European Patent Application No. 20461519.9 filed Mar. 6, 2020, the entire contents of which is incorporated herein by reference.

TECHNICAL FIELD

The present disclosure relates to a Linear Variable Differential Transducer (LVDT) and, more specifically, the structure of the magnetic core of an LVDT.

BACKGROUND

LVDTs are used to indicate or measure the position or displacement of moving components, such as a hydraulic spool, or piston. An LVDT generally comprises three wire coils around a moveable magnetic core. A primary coil is provided with a current which induces current in the secondary coils. The induced currents can be used to determine the position of the moveable magnetic core.

LVDTs can be used in a wide range of applications including in aircraft and other vehicles. In many applications, the LVDTs are operating in harsh environments with large temperature ranges and are subject to strong vibrations and other stresses.

The magnetic core usually comprises a soft magnetic material. Stresses can be applied to the magnetic core due to thermal deformations or pressure on the core. As the magnetic flux of the LVDT electromagnetic circuit is transmitted mainly through the core near the surface, stresses in this area can adversely affect the linearity, repeatability and stability of the LVDT performance for all operating conditions.

In addition, particularly for aerospace environments, the outer surfaces of the soft magnetic core are generally protected against frictional wear by a paramagnetic protective sleeve or tube.

There is, therefore, a need for a structure that avoids or reduces stress at the surface of the soft magnetic core, in particular, there is a need for a core structure designed to work in demanding environments, e.g., in the presence of hot fuel, hydraulic oils or corrosive liquids as is often found in aerospace environments.

SUMMARY

In accordance with the disclosure, there is provided a magnetic core structure for an LVDT comprising an elongate core of soft magnetic material mounted within a protective tube and means for positioning the core within the protective tube, the means for positioning comprising a ball provided within the protective tube at one end of the core, the ball being formed of an elastic material having a coefficient of thermal expansion greater than that of the core magnetic material.

The ball is preferably formed of a polymer material such as polyetheretherketone, PEEK, or PEEK 1000, or other polymer matched to the requirements of the application.

Additional positioning means may be provided at the other end of the magnetic core. This may be in the form of a bushing or a rod. Preferably the bushing or rod has a domed end that engages with a recess formed at the corresponding end of the magnetic core.

A plug may be provided to secure the ball in the tube.

Also provided is an LVDT having the magnetic core structure described above and a primary coil and first and second secondary coils wound around the protective tube.

BRIEF DESCRIPTION OF THE DRAWINGS

FIG. 2A is a sectional view of the magnetic core structure of the present disclosure.

FIG. 2B is a sectional view of the structure of FIG. 2A.

FIG. 2C is a detailed view of section B of FIG. 2A.

FIG. 2D is a detailed view of section C of FIG. 2A.

DETAILED DESCRIPTION

Figure 1:
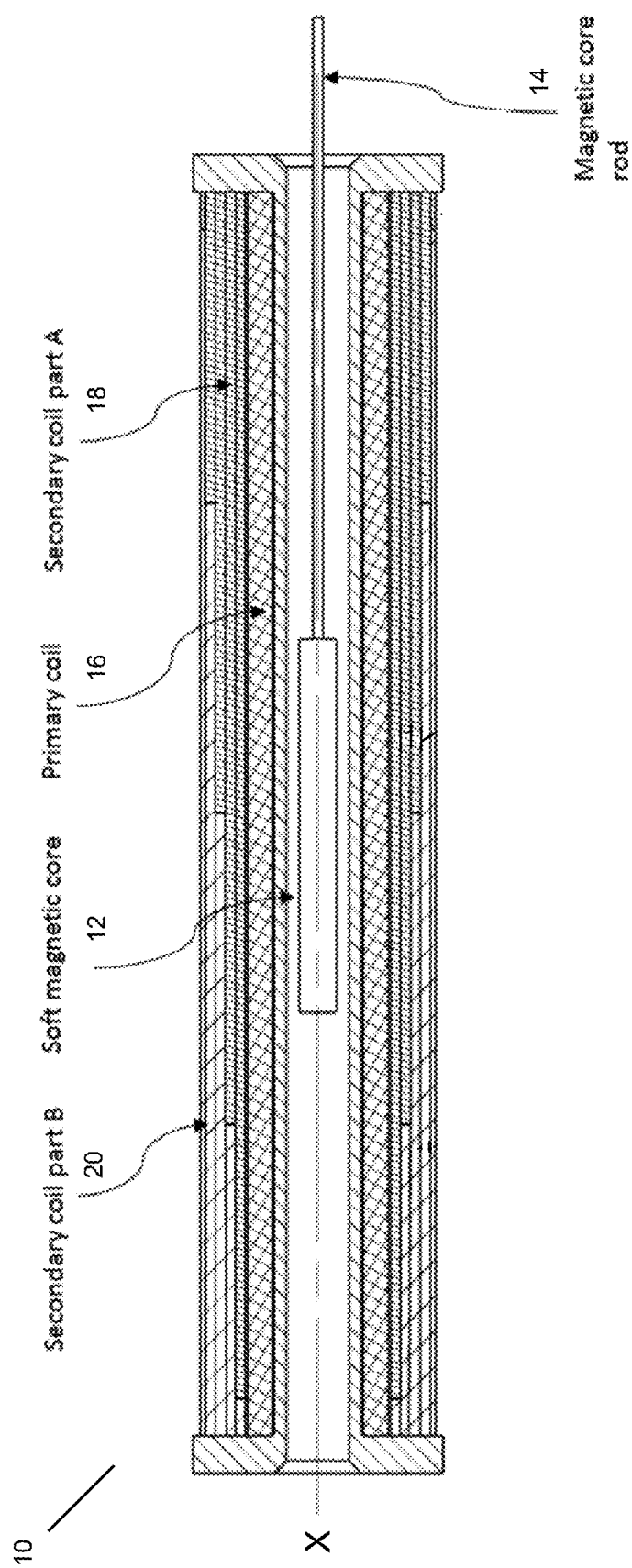
FIG. 1 is a sectional view of a known long stroke linear variable differential transformer.

The described embodiments are by way of example only and are not intended to limit the claims.

The structure of a typical long stroke LVDT will be briefly described with reference to FIG. 1.

The LVDT 10 comprises a tubular magnetic core 12 mounted on a core rod 14. The support rod 14 is attached to the actuating element (not shown) whose displacement is to be measured or detected by the LVDT.

The LVDT further comprises a primary coil 16 for generating a magnetic field when supplied with excitation voltage, a first secondary coil 18 in which a current is induced by the magnetic field from the primary coil 16, and a secondary coil 20 in which a current is induced by the magnetic field from primary coil 16. The coils may be wound about a common axis X. Different coil windings and winding patterns are known in the art. The rod 14 moves relative to the coils 16, 18, 20 along the axis displacing the magnetic core 12 relative to the coils. A voltage is derived from the induced currents. The voltage is indicative of the displacement of the magnetic core and hence the position of the moving component to which the core is connected.

As mentioned above, it is seen that the magnetic flux is transmitted mainly through the core area near the surface, and its density increases as a function of penetration depth. The depth of penetration of the magnetic flux lines depends on the frequency of the excitation voltage applied to the primary coil.

There is, therefore, a need to reduce the stresses acting on the outer surface of the magnetic core during operation and assembly of the core The solution provided by the structure of this disclosure will be explained with reference to FIGS. 2A-2D.

The soft magnetic core 1 is mounted inside a protective tube 2 to protect the core against frictional wear. The protective tube 2 is preferably made of a paramagnetic material.

To secure the magnetic core in the tube and to protect it against stresses, a ball insert 3 is provided at one end 5 of the core inside the tube. The ball insert 3 may be secured in the tube by a plug 4.

The ball is made of an elastic material that has a greater coefficient of thermal expansion than that of the magnetic core material. Preferably, the ball insert is made of a polymer material e.g. PEEK, such as PEEK 1000. The material and dimensions of the ball insert 3 are selected to compensate the differences in elongation of the core assembly components at different temperatures.

The ball insert 3 is structured to eliminate all degrees of freedom of the soft magnetic core material and maintains the gap between the core 1 and the protective tube 2 made of a material with austenite structure and a soft magnetic part.

Thus, residual stresses occurring during LVDT operation are only visible in the central contact area of the soft magnetic part which is the part of the core that does not participate in the distribution of magnetic flux and so this does not affect the operation of the circuit. The area of the soft magnetic core involved in the transfer of the magnetic field depends on the excitation voltage frequency applied to the electromagnetic circuit.

The other end 6 of the magnetic core is attached, as described above, to the actuator 7 by means of a rod 8 or bushing. Whilst this end fitting can be the same as described above for conventional LVDTs, a more preferred embodiment provides the rod or bushing with a tapered or domed end 9 that fits into a recess 19 formed in the end 6 of the magnetic core 1. The magnetic core 1 is connected to the other elements of the assembly by the contact with the rod 8.

All components of the structure are made of materials with low magnetic permeability. Structural elements are preferably joined using electrical bonding or laser welding forming a hermetic cavity for the core to isolate it from any chemicals within which the LVDT is operating.

The assembly of this disclosure provides a simple yet robust structure and enables stable and reliable LVDT performance over a wide temperature range and in harsh environments. The soft magnetic core can be fully isolated from the environment and is subjected to considerably reduced stresses.

The invention claimed is:

1. A magnetic core structure for a Linear Variable Differential Transducer (LVDT) comprising:
   an elongate core of magnetic material mounted within a protective tube; and
   a ball provided within the protective tube at one end of the core, for positioning the core within the protective tube, the ball being formed of an elastic material having a coefficient of thermal expansion greater than that of the core magnetic material selected to compensate the difference in elongation between magnetic core structure components caused by thermal expansion.

2. The magnetic core structure of claim 1, wherein the ball is formed of a polymer material.

3. The magnetic core structure of claim 2, wherein the polymer material is polyetheretherketone.

4. The magnetic core structure of claim 1, further comprising additional means at the other end of the magnetic core.

5. The magnetic core structure of claim 4, wherein the positioning means comprises a bushing or a rod.

6. The magnetic core structure of claim 5, wherein the bushing or rod has a domed end that engages with a recess formed at the corresponding end of the magnetic core.

7. The magnetic core structure of claim 1, further comprising a plug to secure the ball in the tube.

8. A Linear Variable Differential Transducer (LVDT) comprising:
   a magnetic core structure as claimed in claim 1;
   a primary coil; and
   first and second secondary coils wound around the protective tube.

* * * * *